Dec. 6, 1955 J. A. STANKEY 2,726,180
METHOD OF REMOVING ADHERENT MATERIALS
Filed May 28, 1954
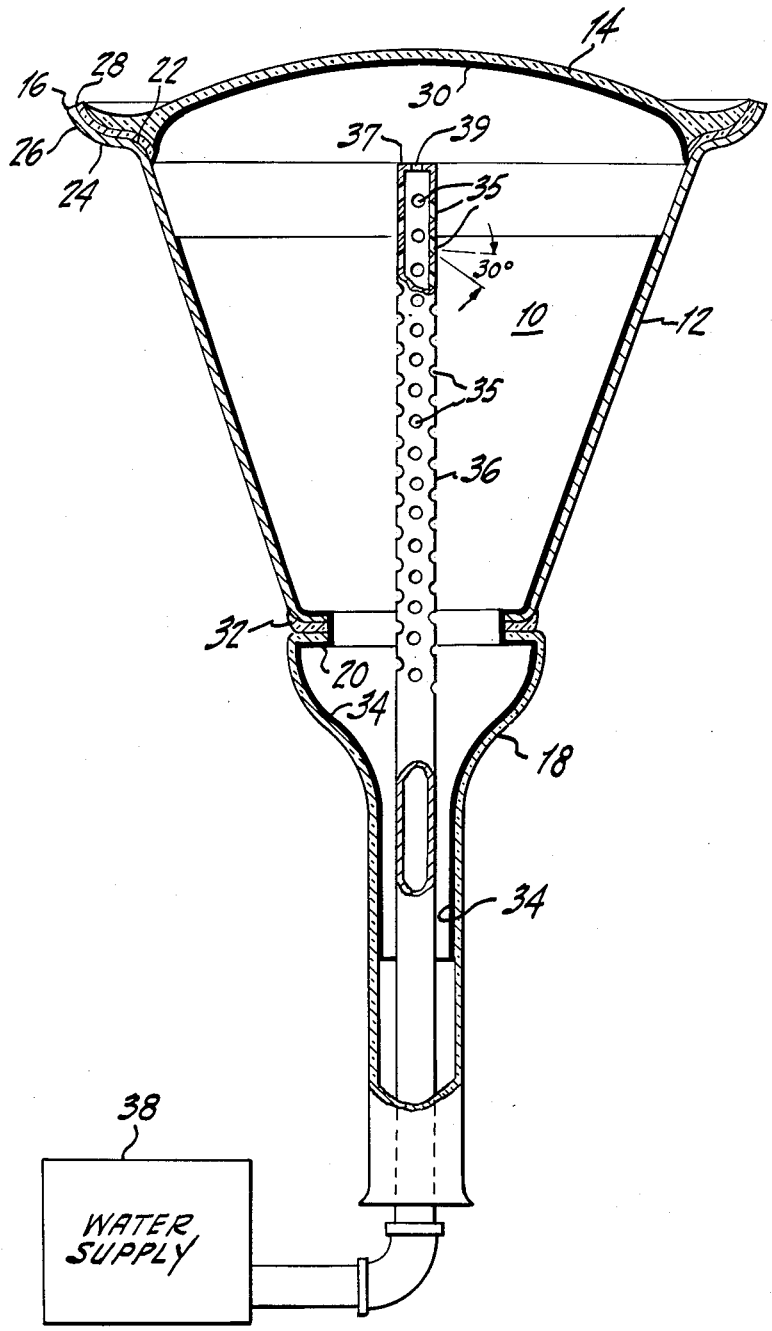
INVENTOR.
JAMES A. STANKEY
BY
William A. Zalesak
ATTORNEY

United States Patent Office 2,726,180
Patented Dec. 6, 1955

2,726,180

METHOD OF REMOVING ADHERENT MATERIALS

James A. Stankey, Marion, Ind., assignor to Radio Corporation of America, a corporation of Delaware Application May 28, 1954, Serial No. 433,006

7 Claims. (Cl. 134—22)

My invention relates to a method of manufacturing cathode ray tubes of the kind provided with a fluorescent screen on a transparent viewing face, and in particular, to an improved method of removing adherent coatings from the interior of such tubes without damaging said viewing face.

One type of tube to which my invention is applicable is the well-known kinescope or television picture tube. It has proved advantageous from a manufacturing as well as a safety standpoint to make large size kinescopes from a composite glass-and-metal envelope. Such an envelope or bulb has a main metal portion or shell which may be either frusto-pyramidal or frusto-conical, sealed at its large end to a phosphor coated glass face plate for providing a luminescent screen, and sealed at its small end to a tubular glass portion for housing an electron gun. To facilitate making the glass-to-metal seals, an intermediate vitreous enamel layer is usually provided between the sealing surfaces of the metal shell and glass members.

The envelope contains along a portion of its interior surface, an annular band of conductive material such as carbon or graphite. The internal conductive band covers the junction between the glass tubular gun housing and the metal shell and regions adjacent thereto. In the operation of the finished tube, the metal shell and internal conductive band function as an accelerating anode.

During manufacture of the tube, the envelope is first formed by sealing the face plate and tubular gun housing to the opposite ends of the metal shell, with a suitable vitreous enamel frit composition applied between the sealing surfaces of the metal shell and face plate. The phosphor coating is then applied to the face plate, mixed with a suitable silicate binding agent to bind the phosphor particles together and to the glass face plate. Application of the phosphor screen is usually accomplished by a settling process. The conductive coating is then applied to the interior of the envelope, the carbon or graphite particles likewise being mixed with a silicate binding agent to achieve the proper adherence of the coating to the envelope. Application of the coatings is then followed by a baking process which causes the phosphor and conductive coatings to adhere firmly to the face plate and envelope surfaces where applied.

A substantial number of bulbs are rejected during manufacture as failing to meet certain standards of performance. As a cost saving measure, an effort is made to salvage these bulbs so that they can be used again. Salvaging bulbs entails removal of the phosphor screen only or removal of both the phosphor screen and conductive coating.

Rejects may occur because of faulty phosphor screen deposition, for example, holes or dirt in the phosphor screen, before application of the conductive coating and before baking, in which event only the phosphor screen need be removed and the bulb rescreened. Other rejects may occur after application and baking of both the phosphor screen and conductive coating, due to holes or dirt in the phosphor screen, for example, or because some of the conductive coating has flaked off onto the phosphor screen. In such case, both the phosphor screen and conductive coating must be removed to provide a thoroughly cleaned bulb for rescreening, it being desirable to remove the conductive coating to avoid contamination of the screen during settling of the phosphor.

One way to remove these coatings from the envelope according to the prior art consists in treating the coatings with a chemical agent, such as hydrofluoric acid or ammonium bifluoride. The chemical agent attacks the binder in the phosphor screen, thereby loosening the phosphor particles, which are then flushed out of the envelope with water, and also removes a minutely thin layer of glass from the entire inner face plate surface to complete the cleaning operation. The conductive coating is similarly removed through chemical attack of its binder and subsequent flushing.

The hydrofluoric acid or ammonium bifluoride treatment works satisfactorily for metal envelope tubes not employing an enamel sealing aid. However, when the same chemicals are used to salvage composite metal-glass bulbs having an interposed enamel sealing layer, an unexplainable milky-white ring stain appears on the face plate and the bulb can no longer be used.

My theory of the ring formation is that certain elements which I have not been able to identify are driven from the enamel into the molten seal during the face plate sealing operation and are absorbed or deposited a minute distance beneath the inner surface of the face plate. A potential ring stain thus develops on the face plate; potential, because so long as any concentration of hydrofluoric acid or ammonium bifluoride is not used as a washing agent, an actual etched ring stain will not be developed. When the bulb is washed with chemicals heretofore used, a microscopic etch develops, appearing to the naked eye as a milky white ring, approximately 3/8" wide around the perimeter of the face plate. It is believed that the acid performs its normal desired cleansing operation on the main portions of the glass face plate, including removal of a minute layer of face plate glass, without staining the glass. In peripheral portions of the face plate, however, where formerly there existed a minute thickness of face plate glass over the enamel elements, the glass has been removed and apparently the enamel elements are now exposed to the acid. Thus, because of the difference in the solubility rates of the face plate glass and the enamel elements in the acid, a microscopic etch develops which is visible. I have not been able to determine whether the enamel elements are more soluble or less soluble in the acid than the glass.

It is therefore an object of my invention to provide an improved method of removing adherent materials from the interior of cathode ray tube bulbs without damaging the face plate.

A further object is to provide an improved method of removing fluorescent screens from cathode ray tubes without producing stains on the face plate.

A further object is to provide an improved method of removing carbonaceous material from cathode ray tube interiors.

The above and related objects are achieved in accordance with my invention by utilizing a weak solution of hydrofluosilicic acid as a chemical agent for treating the coating materials in cathode ray tube bulbs. I have found that hydrofluosilicic acid will attack the silicate binders present in fluorescent screens and conductive carbon coatings without damaging the glass face plate. I have found further that composite glass-and-metal bulbs employing a vitreous enamel sealing aid can be treated with hydrofluosilicic acid without the resultant formation on the face plate of milky-white ring stain. The hydrofluosilicic acid is equally effective in dissolving the silicate binders in the phosphor screen or conductive coating as the chemicals formerly used. However, it does not so readily attack the face plate glass. Hence, the face plate glass can be treated with hydrofluosilicic acid for a substantially longer time before removing sufficient glass to expose the enamel elements in the seal area.

In the single sheet of drawings:

The figure is an elevation view partly in cross-section of a cathode ray tube bulb as viewed during one step of the bulb washing process according to my invention.

Referring to the drawing, a cathode ray tube bulb 10 is shown including a metal frustum or shell 12, which by way of example, may be made of cold-rolled steel or an alloy of chromium and iron, a glass face plate 14 sealed to a large flange 16 at one end of the shell 12, and a tubular gun housing or glass cone 18 sealed to a small flange 20 at the other end of the shell 12.

The large flange 16 is provided with a shoulder 22, a land 24, and a lip 26. A layer 28 of vitreous enamel is sealed intermediate the large flange 16 and the periphery of the face plate 14. A phosphor screen or coating 30 covers the inner surface of the face plate. The phosphor coating 30 may comprise for example, blue fluorescing zinc sulfide activated with silver (ZnS:Ag) and yellow fluorescing zinc cadmium sulphide activated with silver (ZnCdS:Ag) in the desired proportions to provide a white luminescence. However, since my invention is not limited to any specific phosphors, other phosphors may be used, such as, for example, zinc silicate activated with manganese ($Zn_2SiO_4$:Mn), zinc fluoride activated with manganese ($ZnF_2$:Mn), magnesium silicate activated with manganese ($MgSiO_3$:Mn), zinc beryllium silicate activated with manganese ($Zn_8BeSi_5O_{19}$:Mn), and other known materials or mixtures thereof. In the manufacture of the tube, the phosphors are mixed with other materials, such as a silicate binder, which according to well-known methods, facilitates settling the phosphors on and then adherence to the glass face plate 14. Potassium silicate and sodium silicate are examples of binding agents commonly used. The bulb 10 may or may not be provided with a layer 32 of vitreous enamel sealed intermediate the small flange 20 and the glass cone 18, and in some cases the enamel may cover the interior surface of the metal shell 12 or both interior and exterior surfaces.

Various enameling compositions are disclosed in an application filed June 6, 1952, by Laverne J. Conklin, Serial No. 292,153, and assigned to the assignee of the present invention. According to Conklin's invention, the sealing enamel is prepared by mixing a quantity of a powdered glass frit with a refractory suspending agent and water to provide a desired consistency. For example, the powdered glass may be of the same type of glass as the face plate or it may be a suitable mixture of a hard glass frit and a soft glass frit. The refractory suspending agent used is a clay, and is used to provide a good suspension for the components of the enamel mixture and to impart refractory qualities to the enamel. The refractory agent is also an important factor in reducing metal oxidation.

The glass cone 18 is covered on a portion of its interior surface with a conductive coating 34 which extends over the glass cone-metal shell seal and covers a major portion of the metal shell 12. The conductive coating may comprise particles of carbon or graphite mixed with a suitable silicate binder, for example, sodium or potassium silicate, to facilitate adherence to the glass cone.

In order to remove the phosphor coating 30 from the face plate 14 and the conductive coating 34 from the glass cone 18 and from the enameled or non-enameled metal shell 12, I provide a closed-sided, open ended acid spray pipe (not shown) which can be inserted through the glass cone 18 and into the interior of the bulb 10. The acid spray pipe is connected to an acid supply (not shown) which under suitable pressure will deliver a spray of hydrofluosilicic acid. The bulb 10 is preferably rotated during spraying to impart a swirling motion to the acid, and thus facilitate softening of the silicate binders.

After the hydrofluosilicic acid has been sprayed into the bulb 10 for a time sufficient to dissolve the silicate binders in the phosphor and conductive coatings, the bulb is then transferred to a water spray position to remove and flush out the loosened coating particles still adhering to the bulb. In the water spray position, I provide a spray pipe 36 connected to a source 38 for supplying water under suitable pressure. Here again the bulb is rotated during spraying.

The spray pipe 36 is provided with a plurality of orifices 35 arranged in spiral fashion along its length. Each of the orifices 35 has its axis located at about 30° with respect to the transverse axis of the spray pipe 36, so that water jets are directed substantially normal to the conductive coating 34. The spray pipe 36 is closed at the top by a cap 37 having a single orifice 39 for directing a water jet against the phosphor screen 30. As an example, one type of water spray pipe successfully used was made of ½ inch diameter stainless steel having orifices 35 of 3/64 inch diameter and orifice 39 of 1/8" diameter. Instead of stainless steel any other suitable material which will withstand the machining operations may be used. The acid spray pipe was made of ½ inch diameter hard rubber or plastic, but any other suitable material may be used.

According to one preferred method, which is used to remove both the phosphor and conductive coatings, I have found that a 5 per cent solution of hydrofluosilicic acid sprayed into the bulb for about 45 seconds followed by water spray at 100 pounds per square inch is sufficient to remove both the phosphor and conductive coatings without promoting a ring etch on the face plate of the bulb.

The pressure of the acid spray is not critical, it being necessary only to thoroughly wet the coatings on the interior of the bulb. From a safety standpoint the pressure is kept low, of the order of 20 pounds per square inch.

The concentration of the acid by itself is not critical. The process relies on a concentration-time factor. In other words, a high acid concentration along with a short spray time could work as well as a low concentration with a long spray time. For control purposes and safety, concentrations below 15 per cent are preferred.

Relatively high water pressure is needed because the water physically removes the conductive coating, once the acid has dissolved the binder, and the softened conductive coating is more difficult to remove than the phosphor screen. Water pressure of the order of 100 pounds per square inch has been used with success.

The water spray time is dependent upon the quantity of water sprayed due to the restricted neck opening of the bulb. I prefer to allow a 10 second delay between each of three 10 second water sprays. The delay enables the accumulated water to drain out of the neck thereby freeing the orifices in the spray rod and allowing them to operate effectively during the next 10 second spray.

My invention may also be practiced to remove only the phosphor screen, and for this purpose, I prefer to use automatic equipment. Since the cleaning requirements are less severe in the case of removing only the phosphor screen, a shorter acid spray time, slightly higher acid concentration, and lower water pressure is used than in the case of removing both the phosphor screen and conductive coating. For example, a typical schedule for use on an automatic spray machine includes two positions of 8 to 10 per cent hydrofluosilicic acid spray for 8 seconds each, and 5 positions of water spray of 8 seconds each. Water pressure is not critical in this case and pressures of 45–50 pounds per square inch are satisfactory. Closed-sided, open ended spray pipes of ½ inch diameter hard rubber or plastic are satisfactory in both the acid spray and water spray positions.

I recognize that a warm acid solution would be more erosive, however, for better control over the process, room temperature solutions are used in both methods. Also, ordinary cold water is satisfactory.

I have found that a bulb can be washed several times according to my invention without damage to the face plate, whereas a single washing with chemicals formerly used will develop an objectionable stain.

What is claimed is:

1. The method of removing carbonaceous coating material from interior surfaces of an envelope of the kind comprising a metal shell, a glass face plate and an intermediate vitreous enamel frit bonding said plate to said shell, said method comprising treating said interior surfaces with a solution of the order of 5 to 15 per cent of hydrofluosilicic acid to loosen said material, and flushing said envelope with water to remove said loosened material.

2. The method of removing phosphor and carbonaceous coatings from interior surfaces of an envelope of the kind comprising a metal shell, a glass face plate and an intermediate vitreous enamel frit bonding said plate to said shell, said method comprising treating said interior surfaces with a solution of the order of 5 to 15 per cent of hydrofluosilicic acid to loosen said coatings without substantially attacking said enamel frit and said glass face plate, and flushing said envelope with water to remove said loosened coatings.

3. The method of removing adherent coating material from interior surfaces of an envelope of the kind comprising a metal shell, a glass face plate and an intermediate vitreous enamel frit bonding said plate to said shell, said method comprising treating said interior surfaces with a solution of the order of 5 to 15 per cent of hydrofluosilicic acid $H_2SiF_6$ to loosen said coating material, and flushing said loosened coating material with water.

4. The method of removing adherent coating materials provided with a silicate binder from interior surfaces of an envelope of the kind comprising a metal shell, a glass face plate, and an intermediate vitreous enamel frit bonding said plate to said shell, said method comprising treating said interior surfaces with a 5 to 15 per cent solution of hydrofluosilicic acid $H_2SiF_6$ to dissolve said silicate binder and loosen said coating materials, and flushing said envelope with water to remove said loosened coating materials.

5. The method of removing phosphor and carbonaceous coatings from interior surfaces of an envelope of the kind comprising a metal shell, a glass face plate and an intermediate vitreous enamel frit bonding said plate to said shell, said method comprising spraying said interior surfaces with a 5 per cent solution of hydrofluosilicic acid for about 45 seconds to loosen said phosphor and said carbonaceous coatings, and spraying said envelope with water at a pressure of about 100 pounds per square inch to flush out said loosened coatings.

6. The method of removing a phosphor screen from the interior of an envelope of the kind comprising a metal shell, a glass face plate, a phosphor screen on said face plate, and an intermediate vitreous enamel frit bonding said plate to said shell, said method comprising spraying said phosphor screen with an 8–10 per cent solution of hydrofluosilicic acid to loosen and remove said phosphor screen, and flushing said envelope with water to remove any phosphor screen particles still adhering to the interior of said envelope.

7. The method of removing a phosphor screen from the interior of an envelope of the kind comprising a metal shell, a glass face plate, a phosphor screen on said face plate, and an intermediate vitreous enamel frit bonding said plate to said shell, said method comprising the steps of spraying said phosphor screen with an 8–10 per cent solution of hydrofluosilicic acid in two steps of 8 seconds each to loosen and remove said phosphor screen from said face plate, and flushing said envelope with water in 5 steps of 8 seconds each to remove any phosphor screen particles still adhering to the interior of said envelope.

No references cited.